United States Patent
Smith et al.

(10) Patent No.: US 7,132,613 B2
(45) Date of Patent: Nov. 7, 2006

(54) METHODS, SYSTEMS, AND TERMINALS FOR LOAD COIL SWITCHING

(75) Inventors: Donald Smith, Vinemont, AL (US); Frederick Diggle, III, Birmingham, AL (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 237 days.

(21) Appl. No.: 10/828,602

(22) Filed: Apr. 21, 2004

(65) Prior Publication Data

US 2005/0236258 A1 Oct. 27, 2005

(51) Int. Cl.
*H01H 9/30* (2006.01)

(52) U.S. Cl. .................. 200/11 R; 200/11 G; 200/1 V; 379/414; 379/93.01

(58) Field of Classification Search .............. 200/11 R, 200/11 G, 1 V, 17 R; 379/414–415, 400, 379/93.01–93.06
See application file for complete search history.

(56) References Cited

U.S. PATENT DOCUMENTS

| | | | |
|---|---|---|---|
| 3,943,412 A * | 3/1976 | Wickstrom | .................. 361/600 |
| 5,929,402 A | 7/1999 | Charles et al. | |
| 6,281,454 B1 | 8/2001 | Charles et al. | |
| 6,546,100 B1 * | 4/2003 | Drew | ......................... 379/415 |
| 2002/0172329 A1 * | 11/2002 | Rashid-Farrokhi | ....... 379/22.02 |
| 2003/0108190 A1 * | 6/2003 | Kaiser | .................... 379/399.01 |
| 2006/0018337 A1 * | 1/2006 | Ryals | ......................... 370/463 |

FOREIGN PATENT DOCUMENTS

WO  WO 02/11249 A1  2/2002

* cited by examiner

*Primary Examiner*—Richard K. Lee
(74) *Attorney, Agent, or Firm*—Myers Bigel Sibley & Sajovec, PA

(57) ABSTRACT

A method for constructing a transmission line unit such that load coils can be selectively connected to a transmission line includes providing a transmission line section having a transmission line and a plurality of load coils electrically connected thereto, and connecting a switch terminal having a plurality of switches to the transmission line section. Each of the switches in the terminal is electrically connected to a respective load coil and is configured to selectively connect the respective load coil to the transmission line. Each switch may have a first switch position that connects the respective load coil in series with the transmission line, and a second switch position that disconnects the respective load coil from the transmission line. The load coils may be provided in an enclosure that is separate from the transmission line and the switch terminal. Related systems and terminals are also discussed.

10 Claims, 10 Drawing Sheets

METHODS, SYSTEMS, AND TERMINALS FOR LOAD COIL SWITCHING

FIELD OF THE INVENTION

The present invention relates to communications networks, and more specifically to the management of load coils in communications networks.

BACKGROUND OF THE INVENTION

Modern communication networks, such as the Public Switched Telephone Network (PSTN), are used to transmit voice and data signals around the world. For example, FIG. 1 illustrates a conventional communications network, including the PSTN 100. As shown in FIG. 1, a central office (CO) 110 of a local telephone company may provide users or subscribers 120a–c with access to the PSTN 100. The portion of the network between the CO 110 and the users 120a–c may be referred to as the local loop 130. The local loop 130 may include a series of transmission line cables 140a–c which may be carried via telephone poles and/or buried underground between the CO 110 and the users or subscribers 120a–c. The design and operation of the PSTN 100 and the CO 110 are well known to those having skill in the art and need not be described further herein.

The transmission line cables 140a–c used in the local loop 130 may each include a plurality of twisted wire pairs, known as POTS (Plain Old Telephone Service) lines. These wire pairs can have substantial capacitance, which may result in a change in impedance with the length of the transmission line. As is well known in transmission line theory, an improperly matched transmission line and load impedance may result in only part of a transmitted signal to be absorbed, with the remainder being reflected back on the twisted pair, which may result in interference on the line and thus signal distortion and/or degradation. As these capacitance effects may increase with transmission line length, they may directly impact the voice band (300 Hz to 3000 Hz) such that higher voice frequencies may be subjected to greater loss or attenuation. As the length of the transmission line is increased beyond 18,000 feet, this attenuation may pose a significant obstacle to voice transmission.

FIG. 2 illustrates a conventional local loop, including a transmission line cable between a CO 210 and a user 220. Referring to FIG. 2, load coils 230a–c are inductors which may be placed on the transmission line 240 to compensate for the capacitive effects at increased transmission line lengths. The load coils 230a–c may be inserted in series with the wire pairs of the transmission line 240 at specific intervals (such as every 6000 feet), so that the known capacitance of the wire pairs may be balanced by the inductance of the load coils 230a–c to maintain a predetermined line impedance. Thus, the effective capacitance of the loop may be reduced, balancing the attenuation across the voice band. As a result, signal reflection may be lowered and voice quality may be improved.

A potential drawback of load coils is their effect on broadband data transmission, such as DSL (Digital Subscriber Line). Since each load coil may appear as extremely high impedance to high-frequency data transmission, DSL and other broadband connections may not be effectively deployed on loaded circuits. In other words, the load coils act as low-pass filters, so that high frequencies cannot pass through the coils. As such, when a user or subscriber wants high frequency service, each and every load coil located on the transmission line between the CO and the user must be "unloaded" or bypassed from the wire pair connected to the particular user.

FIG. 3 illustrates a conventional load coil enclosure installed on a transmission line section. As shown in FIG. 3, the transmission line section 300 includes a load coil enclosure 320 and a transmission line 340. The load coil enclosure 320 includes a plurality of load coils, each of which is connected to a respective one of the plurality of twisted wire pairs included in the transmission line 340 through a splice closure 350. The splice closure 350 is a terminal casing designed to cover the area of the transmission line 340 where the plurality of wire pairs have been exposed for repair, maintenance, and/or installation of network elements. Although the load coil enclosure 320 and splice closure 350 are illustrated as mounted on a telephone pole 360, such enclosures may also be mounted in cabinets, underground manholes, or the like.

In order to bypass a load coil, the location of the load coil enclosure in the outside environment may need to be determined. After gaining access to the load coil enclosure, the specific wire pair servicing the user may need to be separated from the potentially hundreds of wire pairs typically found in transmission line cables so that the corresponding load coil may be bypassed by splicing the wire pair around the load coil. The cable may then need to be recovered with metallic and plastic sheaths, pressurized, and tested for leaks. Alternatively, a user may require that a disconnected load coil be re-connected to the wire pair in a similar manner. In either case, it may typically take two technicians eight hours or more to complete the splicing operation for each load coil on a user's wire pair. Further, bypassing or re-connecting these coils may require coordination between engineering teams and construction crews, resulting in service delays to the customer.

A load coil enclosure that includes load coils and switches within the same housing such that each load coil can be connected or disconnected from a wire pair using a corresponding switch rather than physically removing each coil from the wire pair is discussed, for example, in U.S. Pat. Nos. 5,929,402 and 6,281,454 to Charles et al. However, in order to use such switchable load coil enclosures, a telephone company may be required to replace load coil enclosures that are currently in use. As load coils have been used on transmission lines since the late 1960s, thousands of load coil enclosures are already in place today. To replace all of these existing enclosures with the switchable load coil enclosures of Charles et al. may involve a tremendous cost to the telephone companies, and as such, may be undesirable.

In view of the foregoing, it may be desirable to provide a solution that quickly allows technicians to add or remove load coils from transmission lines without requiring time-consuming splices, service delays, and/or replacement of existing load coil enclosures.

SUMMARY OF THE INVENTION

Some embodiments of the present invention provide methods, systems, and terminals for load coil switching. According to some embodiments of the present invention, a method for constructing a transmission line unit so that load coils can be selectively connected to a transmission line may include: providing a transmission line section having a transmission line and a number of load coils electrically connected to the line; and connecting a switch terminal having a number of switches to the transmission line section, such that each of the switches is electrically connected to a respective load coil and configured to selectively connect the respective load coil to the transmission line. The load coils may be provided in a load coil enclosure that is separate from the transmission line and the switch terminal.

In other embodiments of the present invention, each switch may have a first switch position that connects the respective load coil in series with the transmission line, and a second switch position that disconnects the respective load coil from the transmission line. The transmission line may include a number of incoming and outgoing wire pairs, such that the first switch position electrically connects the respective load coil in series with a respective incoming and outgoing wire pair, and such that the second switch position electrically connects the respective incoming and outgoing wire pair to bypass the respective load coil. The first switch position can connect the respective load coil in series with the transmission line to configure the line for voice service, and the second switch position can disconnect the respective load coil from the transmission line to configure the line for DSL service. In addition, each of the switches may be configured to be controlled electronically from a remote location.

Further embodiments of the invention may include transmission line systems and terminals for selectively connecting load coils to a transmission line according to methods as described above. Other systems, methods, and/or terminals according to embodiments will be or become apparent to one with skill in the art upon review of the following drawings and detailed description. It is intended that all such additional systems, methods, and/or terminals be included within this description, be within the scope of the present invention, and be protected by the accompanying claims.

DETAILED DESCRIPTION OF EMBODIMENTS OF THE INVENTION

Figure 1:
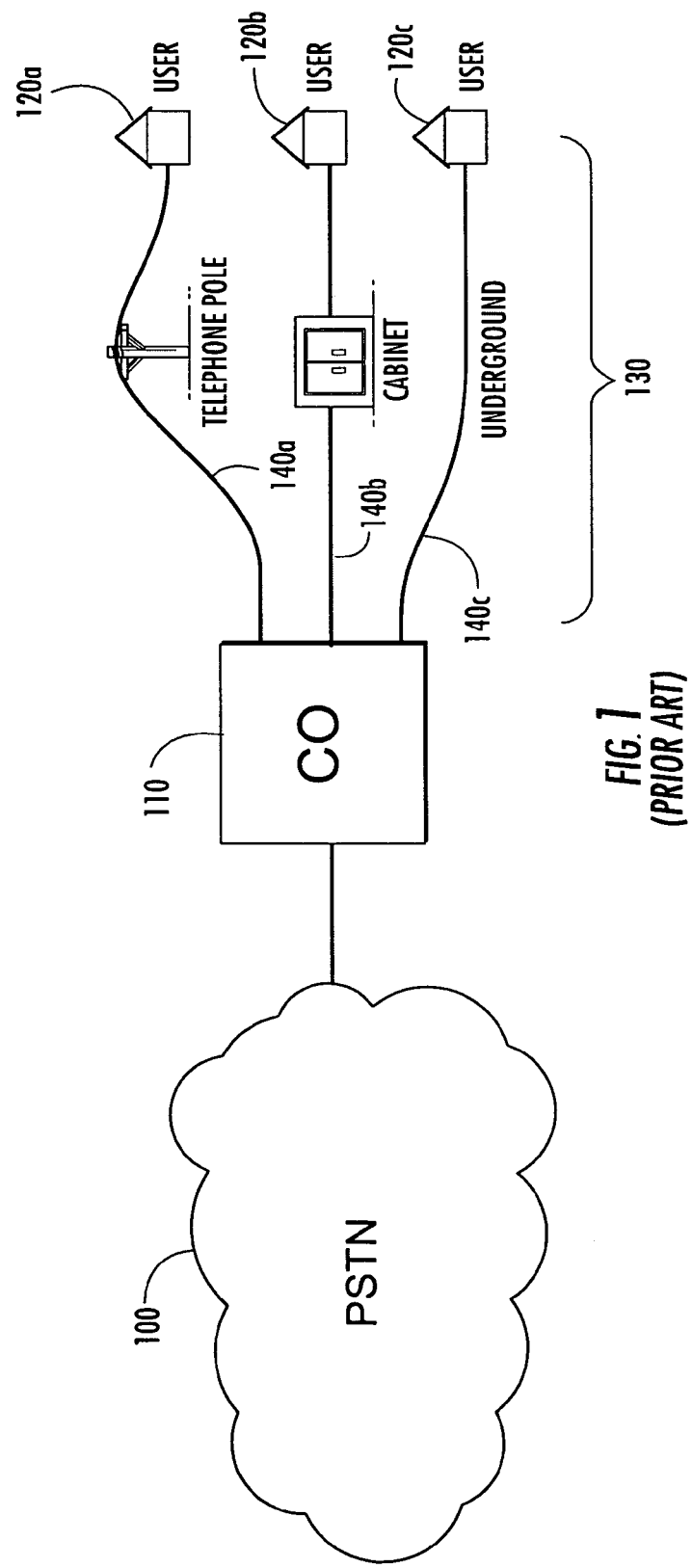
FIG. 1 is a schematic diagram that illustrates a conventional communications network.
Figure 2:
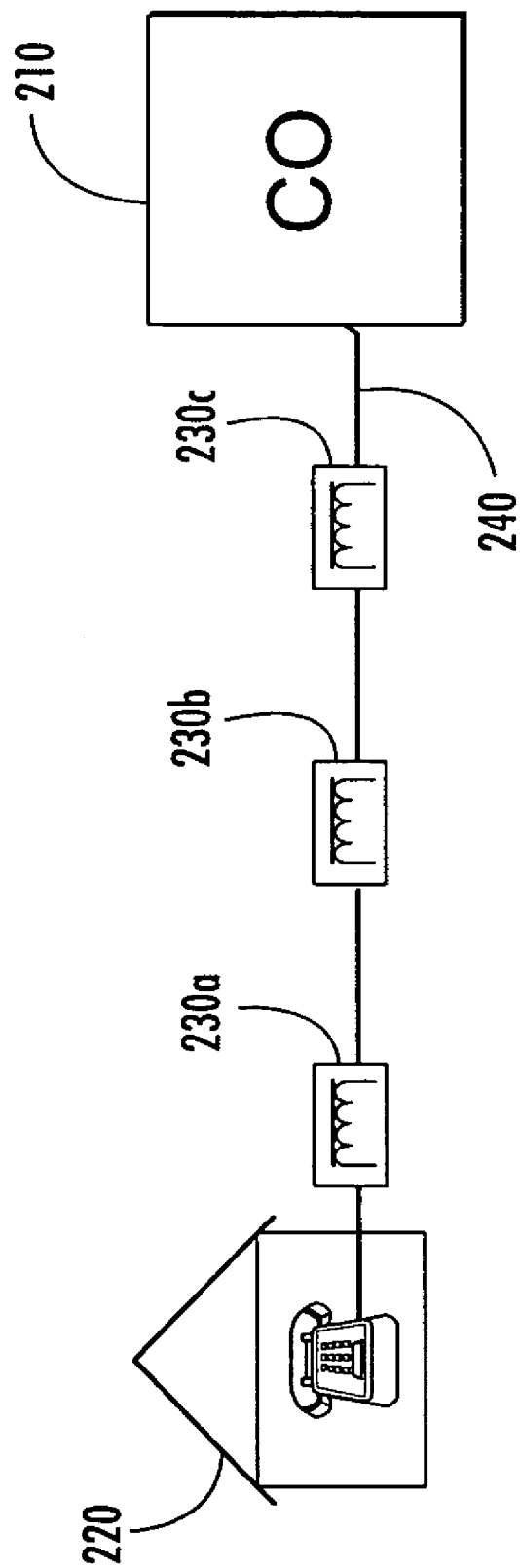
FIG. 2 is a schematic diagram that illustrates a conventional local loop in a communications network.
Figure 3:
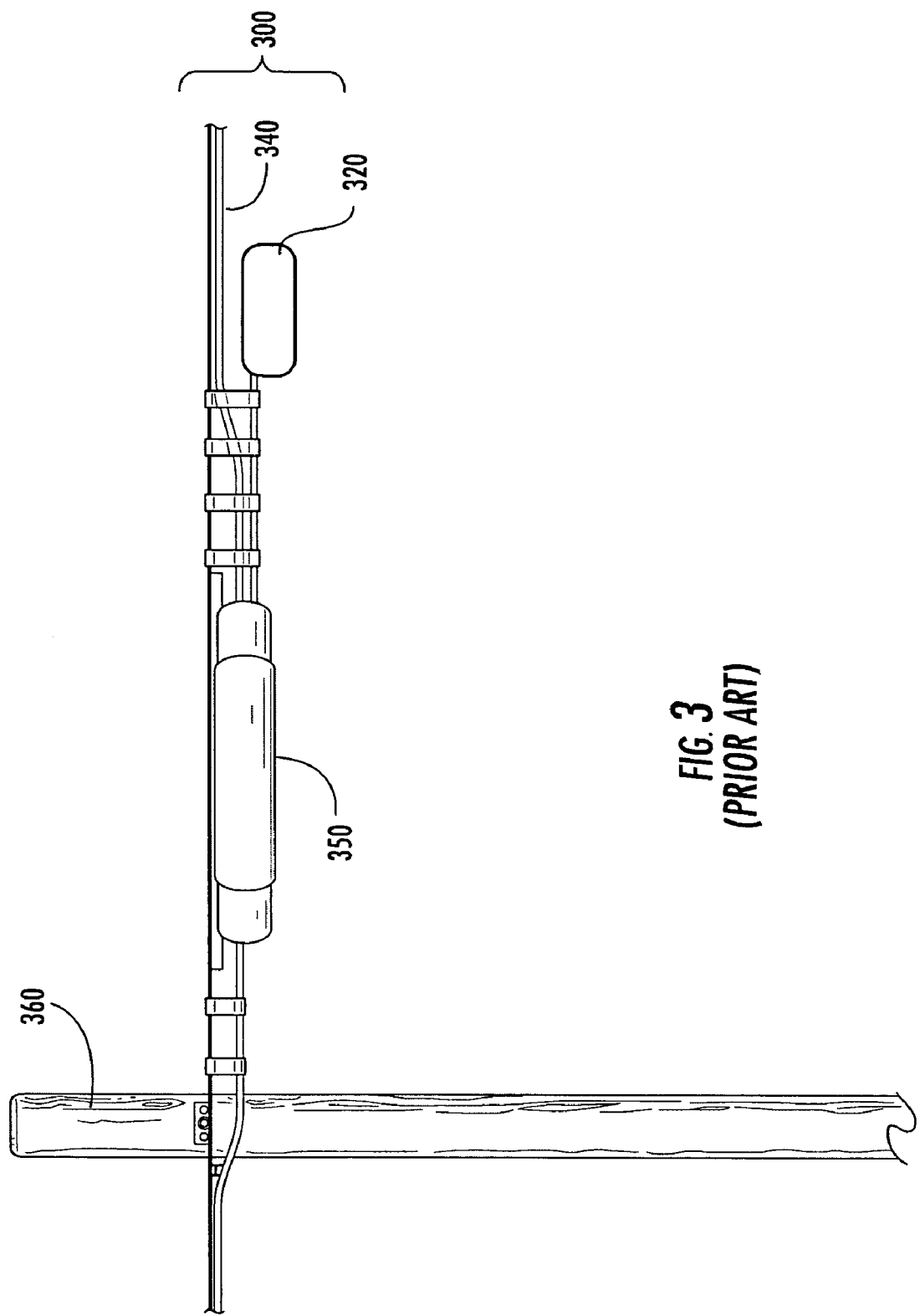
FIG. 3 is a side view of a conventional load coil enclosure installed on a transmission line section.

The present invention now will be described more fully hereinafter with reference to the accompanying figures, in which embodiments of the invention are shown. This invention may, however, be embodied in many alternate forms and should not be construed as limited to the embodiments set forth herein. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures. Thicknesses and dimensions of some components may be exaggerated for clarity. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 4:
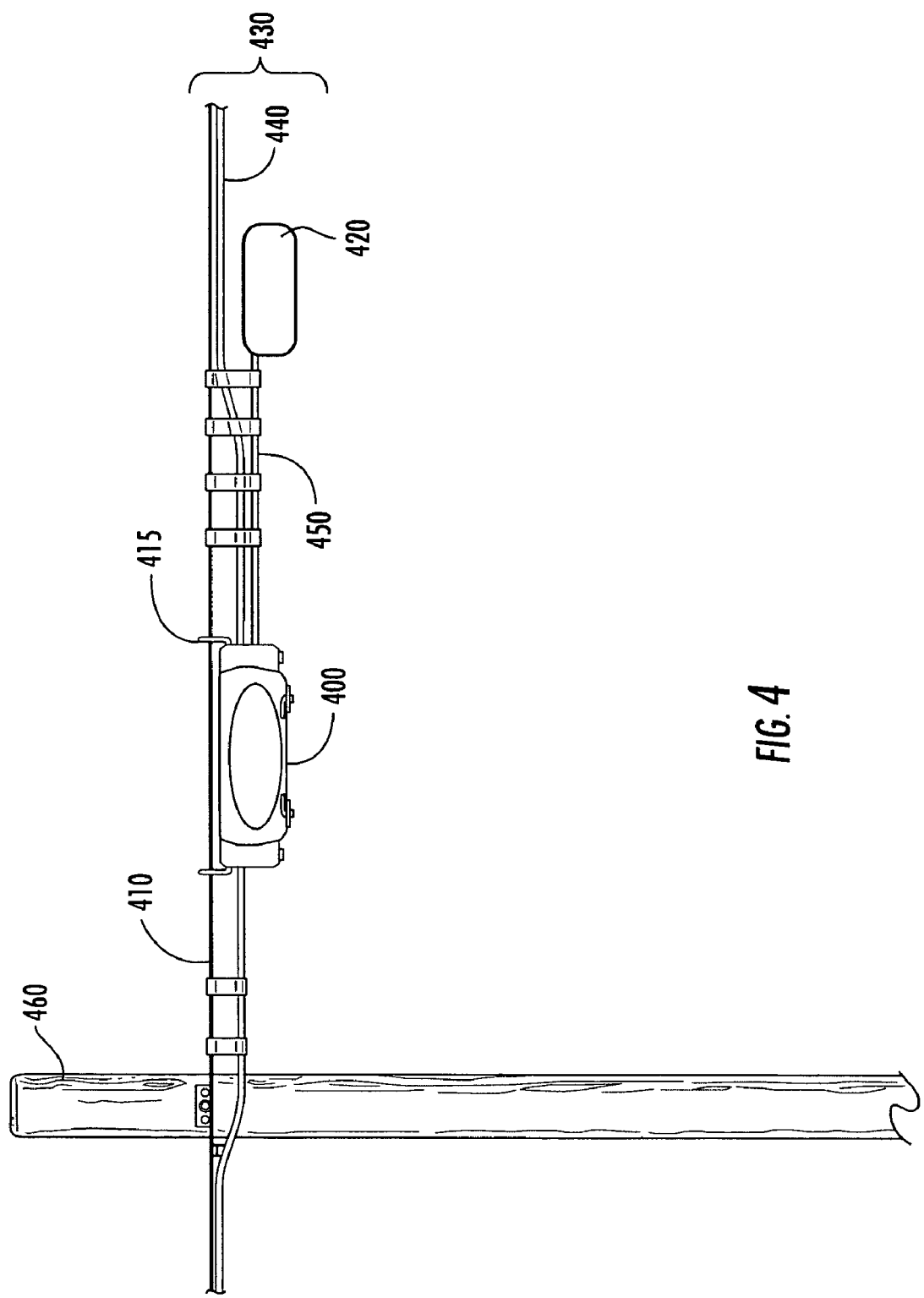
FIG. 4 is a side view of a load coil switching terminal installed on a transmission line section according to embodiments of the present invention.

FIG. 4 illustrates a load coil switching terminal installed on a transmission line section according to embodiments of the present invention. The load coil switching terminal 400 is connected to a telephone pole strand 410 via a strand hanger 415. The design of the strand hanger 415 and methods of connection therewith are well known to those having skill in the art and need not be described further herein.

Still referring to FIG. 4, the load coil switching terminal 400 is connected to an existing load coil enclosure 420 and a transmission line 440. The load coil enclosure 420 and transmission line 440 together form a transmission line section 430. The load coil enclosure 420 contains a plurality of load coils, each of which is connected to a respective one of the plurality of wire pairs contained within the transmission line 440. As the load coil switching terminal 400 is a separate unit, it can be connected between the existing load coil enclosure 420 and the transmission line 440 without having to replace the entire existing load coil enclosure 420. The load coils in the enclosure 420 are connected to the load coil switching terminal 400 through a load coil enclosure cable 450. Although the load coil switching terminal 400 is illustrated as installed on a telephone pole 460, such terminals may also be installed in cabinets, underground manholes, and/or anywhere else that existing load coil enclosures may be located.

Figure 5:
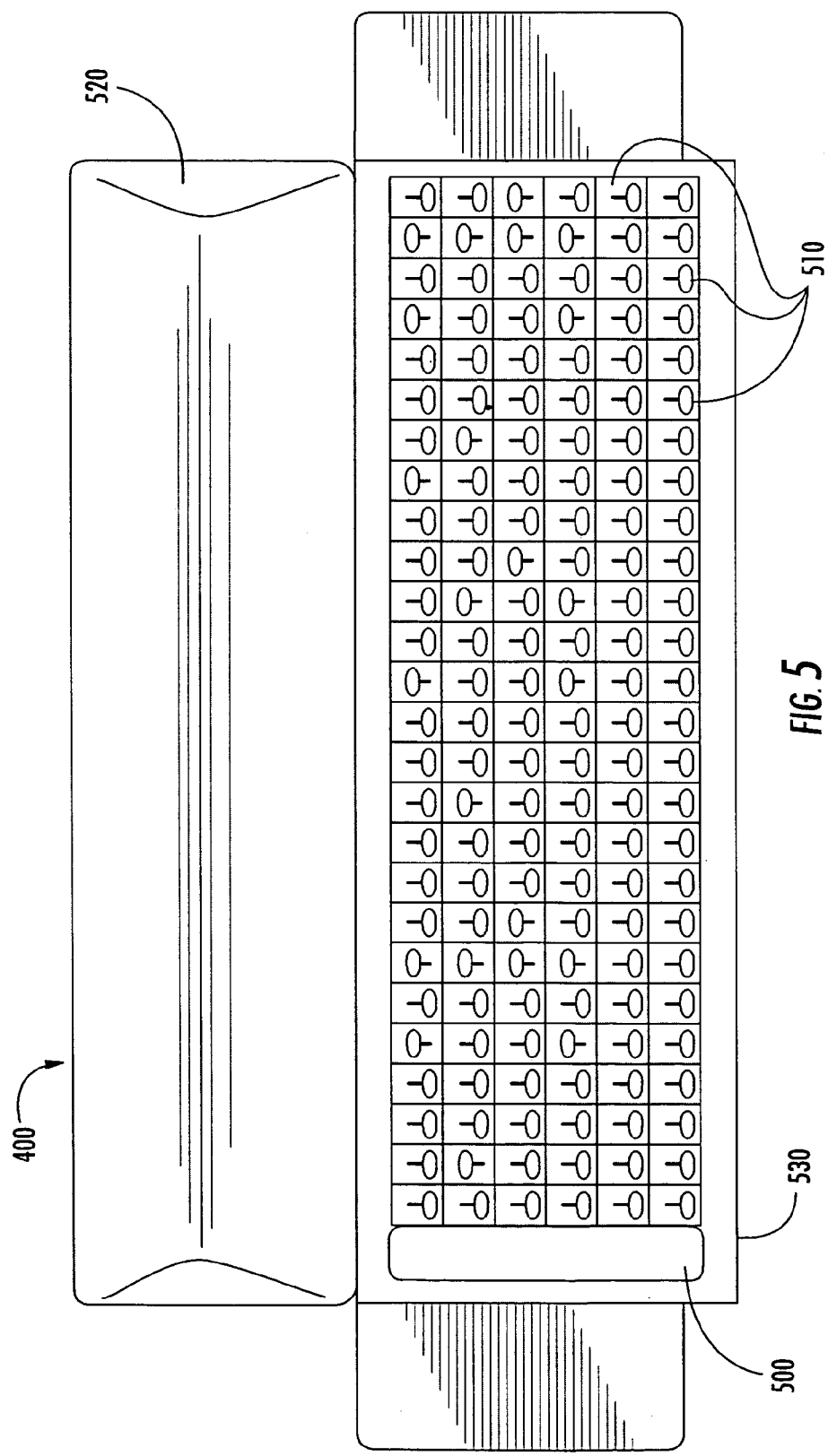
FIG. 5 is a front view of a switch panel mounted in a load coil switching terminal according to embodiments of the present invention.

FIG. 5 illustrates the inside of a load coil switching terminal according to embodiments of the present invention. As shown in FIG. 5, the load coil switching terminal 400 includes a switch panel 500 that contains a plurality of switches 510 which can be accessed by removing the load coil switching terminal cover 520. The switch panel 500 is pivotally mounted to the terminal housing 530, such that the panel 500 can be extended from and retracted within the housing 530 by rotating the panel about the mounting point as appropriate for access. The terminal housing 530 may contain a plurality of switch panels 500, each of which may be pivotally mounted to the terminal housing 530 such that each panel 500 can be rotated about one of a series of substantially parallel axes of rotation.

The number of switches per panel and the number of panels per terminal may be reduced or increased based on the number of load coils on the transmission line, such that one switch per load coil is provided. For example, for a load coil enclosure with 600 load coils, four switch panels may be mounted within the terminal housing with a capacity of 150 switches per panel, for a total of 600 switches per terminal. Thus, each terminal may be filled to a different capacity of panels and switches to accommodate a different number of load coils contained within each load coil enclosure.

Figure 6A:
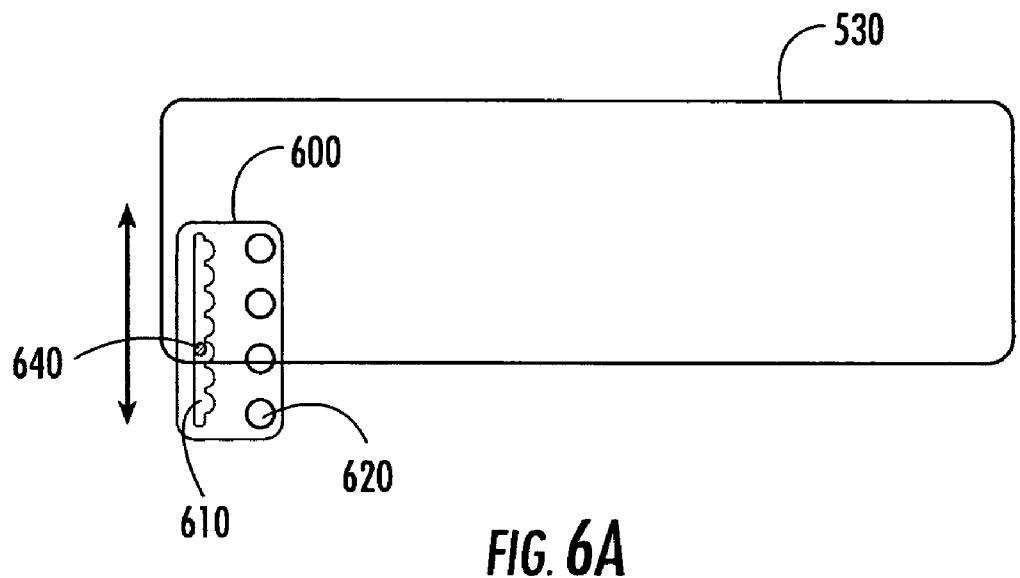
FIG. 6A is a top view of a sliding connector bracket in a load coil switching terminal according to embodiments of the present invention.

FIG. 6A illustrates a sliding panel connector bracket in a load coil switching terminal according to embodiments of the present invention, as seen from a top view of the terminal. Referring to FIG. 6A, the sliding panel connector bracket 600 is used to mount each switch panel to the terminal housing 530. The sliding panel connector bracket 600 includes a slide pin connector sleeve 610 and a series of panel connector holes 620. The slide pin connector bracket 600 is mounted to a top portion of the terminal housing 530 via a slide pin 640. The slide pin 640 rests inside the slide pin connector sleeve 610, such that the connector bracket 600 can extend from and retract within the terminal housing 530. An identical sliding panel connector bracket 650 may be mounted to a bottom portion of the terminal housing 530 (see FIG. 7A). Each panel 500 as illustrated in FIG. 5 may be pivotally mounted to one of the panel connector holes 620 on the connector brackets 600 and 650. As such, the panels 500 may be easily accessed when the connector brackets 600 and 650 are extended from the terminal housing 530.

Figure 6B:
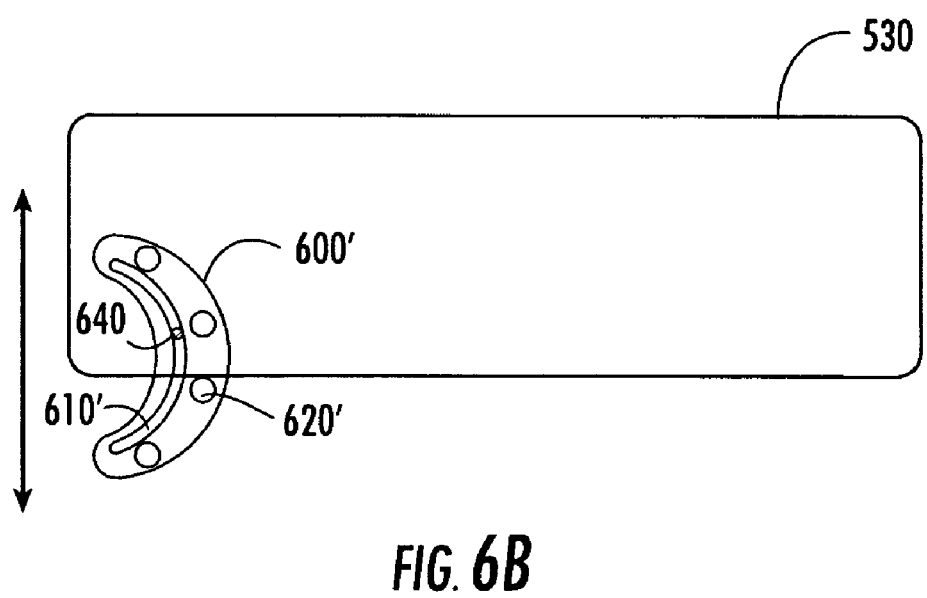
FIG. 6B is a top view of an alternate sliding connector bracket in a load coil switching terminal according to embodiments of the present invention.

FIG. 6B illustrates an alternate sliding panel connector bracket according to embodiments of the present invention. As shown in FIG. 6B, the sliding panel connector bracket 600' includes a slide pin connector sleeve 610' and a series of panel connector holes 620'. The slide pin connector bracket 600' is mounted to the terminal housing 530 via a slide pin 640 in a manner identical to that described above with reference to FIG. 6A. However, the sliding panel connector bracket 600' is crescent-shaped, such that the connector bracket 600' can extend from and retract within the terminal housing 530 and can be rotated with a greater range of motion than the connector bracket 600 of FIG. 6A. As such, the panels 500 of FIG. 5 may be more easily accessed when the connector bracket 600' is extended from the terminal housing 530.

Figure 7B:
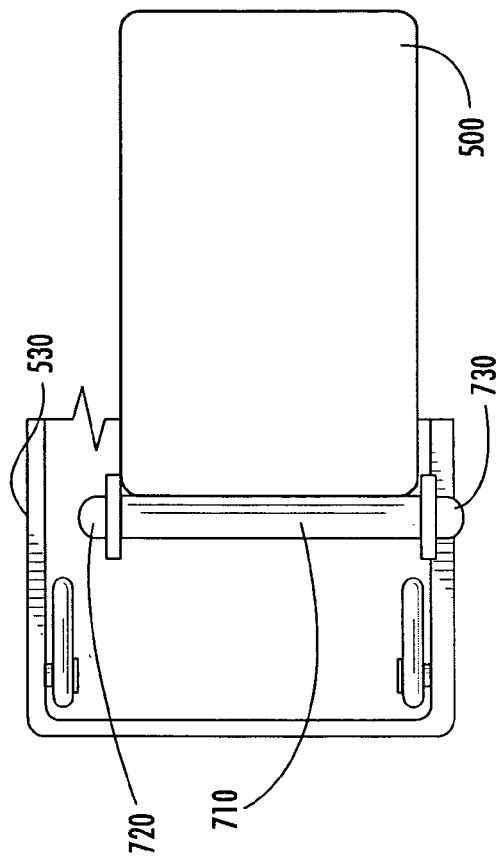
FIGS. 7A–7D illustrate methods of installing a switch panel in a load coil switching terminal according to embodiments of the present invention.
Figure 7D:
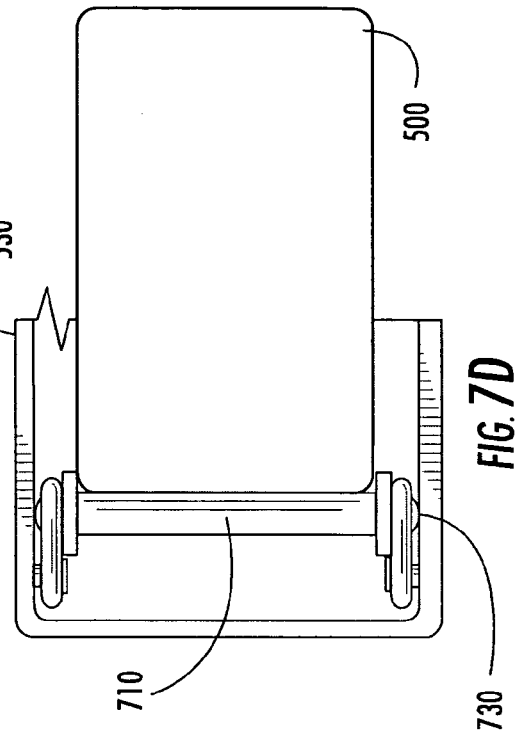
Figure 7A:
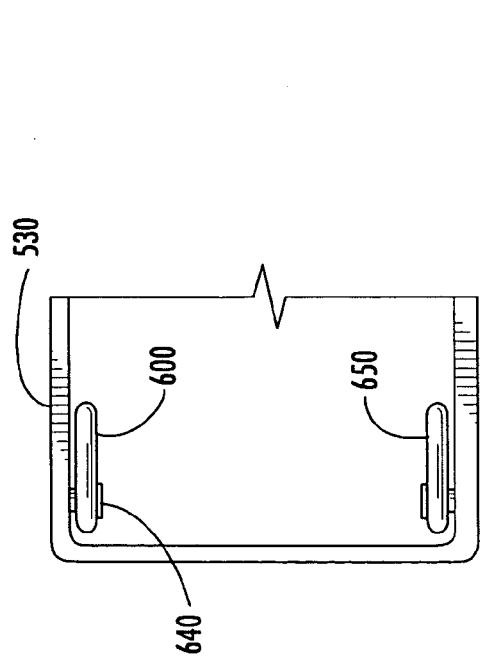
Figure 7C:
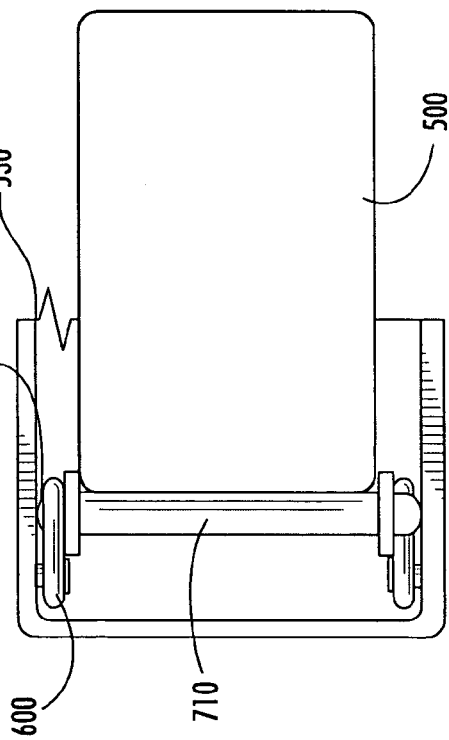

FIGS. 7A–7D illustrate a method of installing a switch panel in a load coil switching terminal according to embodiments of the present invention. Referring to FIGS. 7A–7D, the terminal housing 530 includes upper and lower panel connector brackets 600 and 650, each of which is attached to the housing 530 via a respective slide pin 640 (FIG. 7A). The panel connector brackets 600 and 650 have a series of panel connector holes 620 (as shown in FIGS. 6A and 6B) for mounting switch panels 500. A spring-loaded pin 710 is mounted at one end of the switch panel 500. The spring-loaded pin 710 has an upper cap 720 and a lower cap 730 which are configured to be received by the panel connector holes 620 in the panel connector brackets 600 and 650 (FIG. 7B). To install the panel 500 in the terminal housing, the upper cap 720 of the spring-loaded pin 710 is first inserted into the panel connector hole 620 of the upper connector bracket 600 (FIG. 7C). Then, the lower cap 730 of the spring-loaded pin 710 is inserted into the panel connector hole 620 of the lower connector bracket 650 (FIG. 7D).

Spring-loading of the lower cap 730 may enable it to be recessed into the spring-loaded pin 710 when pressure is applied, to ease insertion. To remove the panel 500 from the housing 530, the process can be reversed.

Figure 8B:
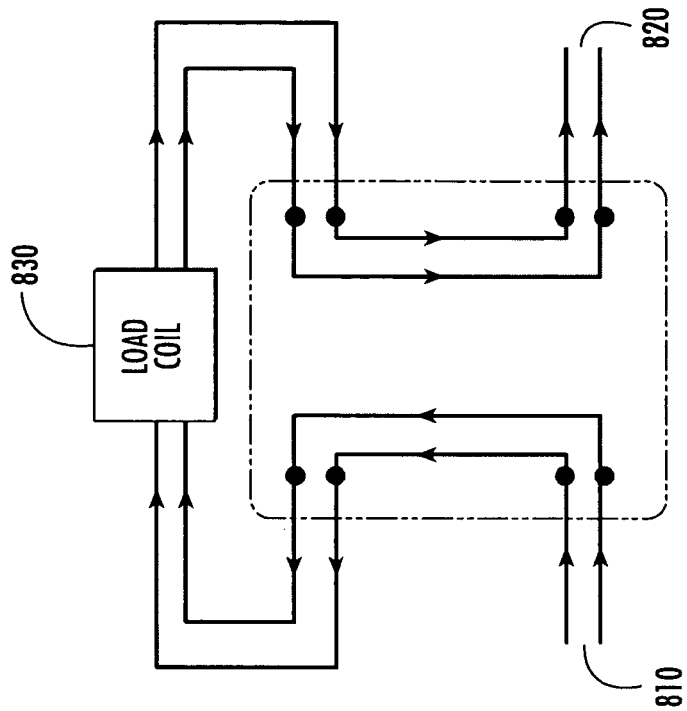
FIG. 8B is a schematic diagram that illustrates the operation of the switch of FIG. 8A.
Figure 8A:
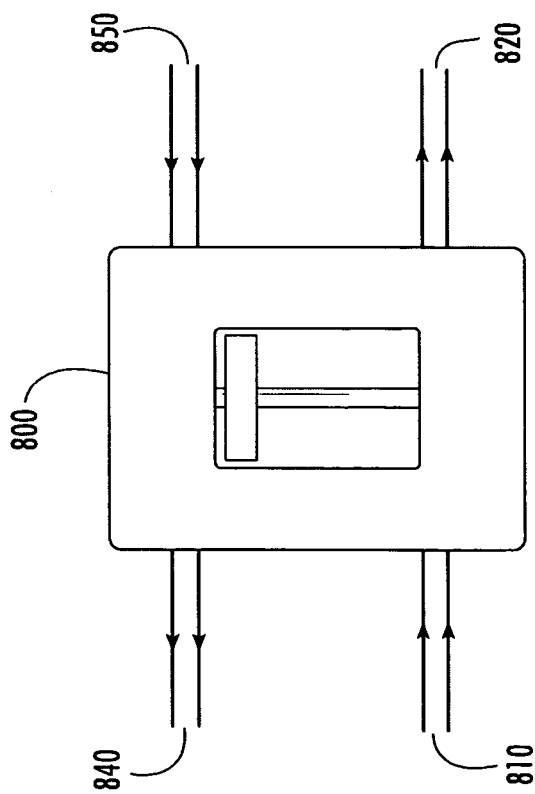
FIG. 8A is a front view of a switch in an upper position for use in a load coil switching terminal according to embodiments of the present invention.
Figure 8D:
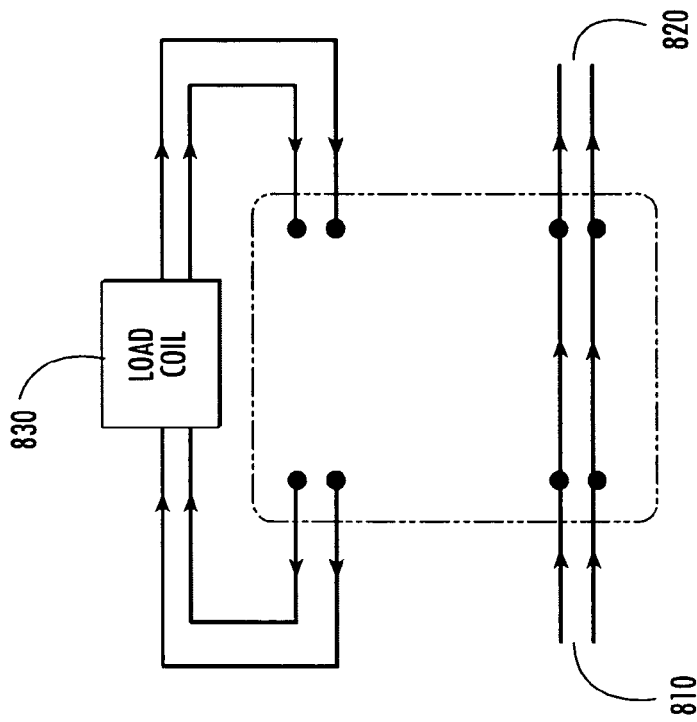
FIG. 8D is a schematic diagram that illustrates the operation of the switch of FIG. 8C.
Figure 8C:
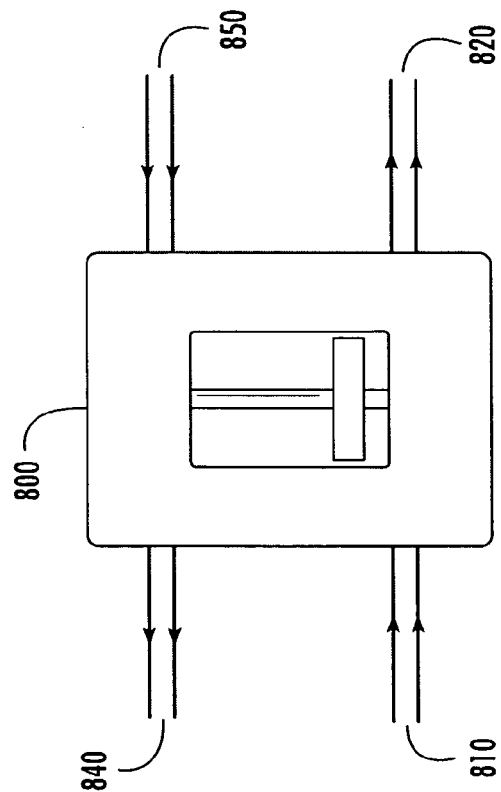
FIG. 8C is a front view of a switch in a lower position for use in a load coil switching terminal according to embodiments of the present invention.

FIGS. 8A–8D illustrate a switch for use in a load coil switching terminal according to embodiments of the present invention. Referring to FIGS. 8A–8D, the switch 800 is connected to an incoming wire pair 810 from the central office and an outgoing wire pair 820 to the user/subscriber. The switch 800 is also connected to a load coil 830 in a load coil enclosure via incoming and outgoing leads 840 and 850. The switch 800 has an upper position (FIG. 8A) and a lower position (FIG. 8C). The switch 800 may be manually operated between the upper and lower positions, or may be operated electronically from a remote location.

FIG. 8B illustrates the operation of the switch in the upper position, as shown in FIG. 8A. Referring now to FIG. 8B, when the switch 800 is in the upper position, the load coil 830 is electrically connected in series between the incoming wire pair 810 and the outgoing wire pair 820. This configures the wire pair for voice service, as the load coil 830 reduces the effective capacitance of the transmission line while preventing the passage of high-frequency signals.

FIG. 8D illustrates the operation of the switch in the lower position, as shown in FIG. 8C. Referring now to FIG. 8D, when the switch 800 is in the lower position, the incoming and outgoing wire pairs 810 and 820 are electrically connected to each other, such that the load coil 830 is bypassed. This configures the wire pair for high-frequency data transmission, such as DSL. Thus, wire pairs can be quickly configured for voice-only or high-frequency data transmission by selectively connecting the respective load coils, without having to physically remove existing load coils from the respective wire pairs. Further, this can be accomplished without having to replace any existing load coil enclosures that are already in service, thereby reducing costs.

Figure 9A:
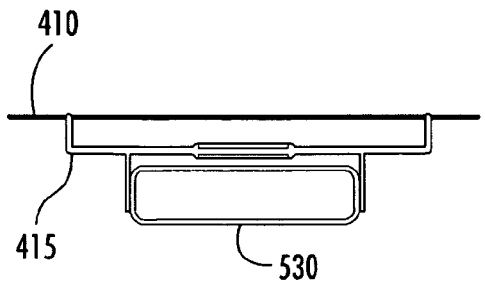
FIGS. 9A–9H illustrate methods of installing a load coil switching terminal according to embodiments of the present invention.
Figure 9B:
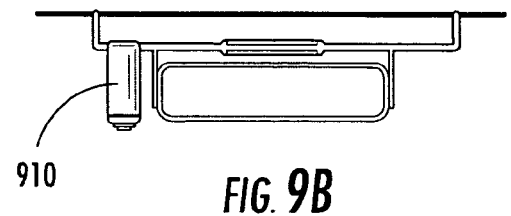
Figure 9C:
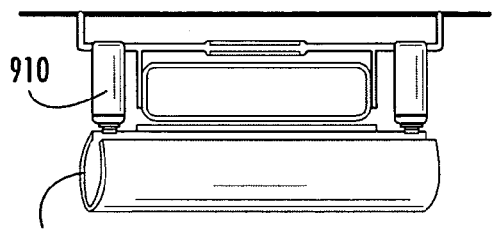
Figure 9D:
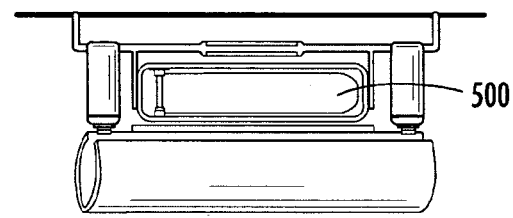
Figure 9E:
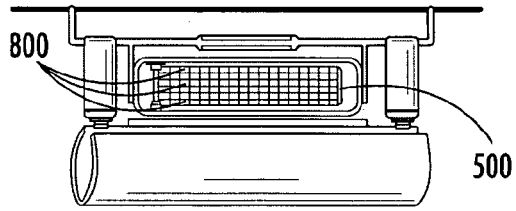

FIGS. 9A–9H illustrate a method of installing a load coil switching terminal on a transmission line section according to embodiments of the present invention. As shown in FIGS. 9A–H, a strand hanger 415 is mounted on a telephone pole strand 410 (FIG. 9A). The load coil switching terminal housing 530 is mounted on the strand hanger 415. Next, terminal braces 910 are attached to each end of the strand hanger (FIG. 9B). The terminal braces 910 have openings through which the transmission line cable 440 and load coil enclosure cable 450 may enter. The load coil switching terminal cover 520 is attached to the terminal braces 910 (FIG. 9C). Switch panels 500 are then placed within the terminal housing 530 according to the method described above with respect to FIG. 7A–7D (FIG. 9D). Each panel may contain a different number of switches 800 mounted on each panel 500 (FIG. 9E).

Figure 9F:
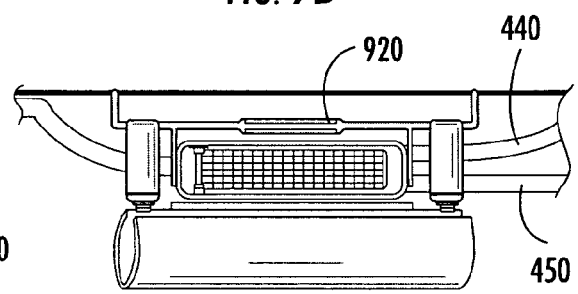

The twisted wire pairs from the transmission line cable 440 are then connected to the switches 800 on each of the panels 500 in the housing 530 (FIG. 9F). Each wire pair is connected to a respective switch 800, and each switch 800 is connected to a respective load coil 830 in the load coil enclosure 420 through the load coil enclosure cable 450. Some transmission line cables 440 may include such a large number of wire pairs that the sheer volume of wires is physically unable to be contained within the terminal housing 530. As such, the switches 800 may be connected to the wire pairs using "punch-down" connectors to reduce the volume of wire pairs within the terminal housing 530. Any unused wire pairs may be connected to the strand hanger ground connection 920.

Figure 9G:
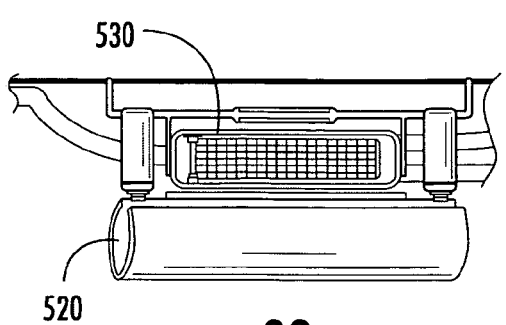
Figure 9H:
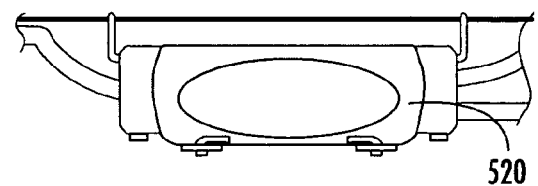

After connecting the transmission line cable 440 and the load coil enclosure cable 450 to the switches 800, the load coil switching terminal cover 520 is secured over the terminal housing 530 (FIG. 9G). The cover 520 may be latched using metal locks or the like (FIG. 9H). As such, load coils may be added or removed from the transmission line by simply opening the cover 520, accessing the desired panel 500, and changing the position of the respective switch 800, without resorting to time-consuming wire splicing and/or load coil enclosure replacement.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. As such, all such modifications are intended to be included within the scope of this invention. The scope of the invention is to be defined by the following claims.

The invention claimed is:

1. A method for constructing a transmission line unit wherein load coils can be selectively connected to a transmission line, comprising:
   providing a transmission line section having a transmission line and a plurality of load coils electrically connected thereto; and
   connecting a switch terminal having a plurality of switches to the transmission line section, each of the switches electrically connected to a respective load coil and configured to selectively connect the respective load coil to the transmission line.

2. The method of claim 1, wherein the plurality of load coils are provided in a load coil enclosure that is separate from the transmission line and the switch terminal.

3. The method of claim 1, wherein each switch has a first switch position that connects the respective load coil in series with the transmission line, and a second switch position that disconnects the respective load coil from the transmission line.

4. The method of claim 3, wherein the first switch position connects the respective load coil in series with the transmission line to configure the line for voice service, and wherein the second switch position disconnects the respective load coil from the transmission line to configure the line for DSL service.

5. The method of claim 3, wherein the first switch position connects the respective load coil in series with the transmission line to maintain a predetermined line impedance, and wherein the second switch position disconnects the respective load coil from the transmission line to permit transmission of high frequency signals.

6. The method of claim 3, wherein the transmission line comprises a plurality of incoming and outgoing wire pairs, wherein the first switch position electrically connects the respective load coil in series with a respective incoming and outgoing wire pair, and wherein the second switch position electrically connects the respective incoming and outgoing wire pair to bypass the respective load coil.

7. A method according to claim 3, further comprising:
   activating each switch to the first position or the second position to selectively connect the respective load coil to the transmission line.

8. The method of claim 1, wherein each of the plurality of switches is configured to be controlled electronically from a remote location.

9. The method of claim 1, wherein the plurality of switches are mounted on a plurality of panels that are pivotally mounted within the switch terminal, so that each panel is rotatable to provide access to the plurality of switches.

10. A method for selectively connecting load coils to a transmission line, comprising:
   providing a transmission line section having a transmission line and a plurality of load coils electrically connected thereto;
   connecting a switch terminal having a plurality of switches to the transmission line section, each of the switches electrically connected to a respective load coil; and
   activating each switch to a first position or a second position, wherein the first switch position connects the respective load coil in series with the transmission line, and wherein the second switch position disconnects the respective load coil from the transmission line to electively connect the load coil to the transmission line.

* * * * *

UNITED STATES PATENT AND TRADEMARK OFFICE
CERTIFICATE OF CORRECTION

| | | |
|---|---|---|
| PATENT NO. | : 7,132,613 B2 | Page 1 of 1 |
| APPLICATION NO. | : 10/828602 | |
| DATED | : November 7, 2006 | |
| INVENTOR(S) | : Smith et al. | |

It is certified that error appears in the above-identified patent and that said Letters Patent is hereby corrected as shown below:

Column 8,
Lines 43-44 should read -- respective load coil from the transmission line to selectively connect the load coil to the transmission line. --

Signed and Sealed this

Twenty-seventh Day of February, 2007

JON W. DUDAS
*Director of the United States Patent and Trademark Office*